US008041871B2

(12) United States Patent
Deshpande et al.

(10) Patent No.: US 8,041,871 B2
(45) Date of Patent: *Oct. 18, 2011

(54) SYSTEM AND METHOD FOR PROVIDING ADDRESS DECODE AND VIRTUAL FUNCTION (VF) MIGRATION SUPPORT IN A PERIPHERAL COMPONENT INTERCONNECT EXPRESS (PCEI) MULTI-ROOT INPUT/OUTPUT VIRTUALIZATION (IOV) ENVIRONMENT

(75) Inventors: Venkatesh Deshpande, Gulbarga (IN); Sujil Kottekkat, Thrissur (IN); Aniruddha Haldar, Kolkata (IN)

(73) Assignee: LSI Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/109,041

(22) Filed: May 17, 2011

(65) Prior Publication Data
US 2011/0219161 A1 Sep. 8, 2011

Related U.S. Application Data

(62) Division of application No. 12/079,260, filed on Mar. 26, 2008, now Pat. No. 7,958,298.

(51) Int. Cl.
*G06F 13/36* (2006.01)
(52) U.S. Cl. .................. 710/310; 710/3; 710/5; 710/52; 711/108
(58) Field of Classification Search ........................ None
See application file for complete search history.

(56) References Cited

U.S. PATENT DOCUMENTS

| 7,424,565 B2 * | 9/2008 | Sandven et al. | 710/310 |
| 7,657,663 B2 * | 2/2010 | Freimuth et al. | 710/5 |
| 7,707,346 B2 * | 4/2010 | Deshpande et al. | 710/310 |
| 2006/0088046 A1 * | 4/2006 | Wong et al. | 370/413 |
| 2007/0268931 A1 * | 11/2007 | Shaikli | 370/468 |

OTHER PUBLICATIONS

Krause et al, "I/O Virtualization and Sharing", 2006, Microsoft, pp. 1-26.*
Zack Mihalis, "PCI Express gains I/O virtualization", Jul. 24, 2006, Network World, pp. 1-2.*
"Intel Virtualization Technology for Directed I/O Architecture Specification", Feb. 2006, Intel, pp. 1-106.*
Multi-Root I/O Virtualization and Sharing Revision 0.7, Jun. 8, 2007, pp. 1-231, Publisher: PCI-SIG, Published in:US.*

* cited by examiner

*Primary Examiner* — Tammara Peyton
(74) *Attorney, Agent, or Firm* — Suiter Swantz pc llo

(57) ABSTRACT

The present invention is a method for providing address decode and Virtual Function (VF) migration support in a Peripheral Component Interconnect Express (PCIE) multi-root Input/Output Virtualization (IOV) environment. The method may include receiving a Transaction Layer Packet (TLP) from the PCIE multi-root IOV environment. The method may further include comparing a destination address of the TLP with a plurality of base address values stored in a Content Addressable Memory (CAM), each base address value being associated with a Virtual Function (VF), each VF being associated with a Physical Function (PF). The method may further include when a base address value included in the plurality of base address values matches the destination address of the TLP, providing the matching base address value to the PCIE multi-root IOV environment by outputting from the CAM the matching base address value. The method may further include constructing a requestor ID for the VF associated with the matching base address value, the requestor ID being based upon the output matching base address value and a bus number for a PF which owns the CAM.

15 Claims, 4 Drawing Sheets

SYSTEM AND METHOD FOR PROVIDING ADDRESS DECODE AND VIRTUAL FUNCTION (VF) MIGRATION SUPPORT IN A PERIPHERAL COMPONENT INTERCONNECT EXPRESS (PCEI) MULTI-ROOT INPUT/OUTPUT VIRTUALIZATION (IOV) ENVIRONMENT

CROSS-REFERENCE TO RELATED APPLICATIONS

The present application is a divisional application of and claims priority under 35 U.S.C. §121 to U.S. application Ser. No. 12/079,260 entitled: System And Method For Providing Address Decode And Virtual Function (VF) Migration Support In A Peripheral Component Interconnect Express (PCIE) Multi-Root Input/Output Virtualization (IOV) Environment filed Mar. 26, 2008. The U.S. application Ser. No. 12/079,260 is herein incorporated by reference in its entirety.

FIELD OF THE INVENTION

The present invention relates to the field of PCI Express® (PCIE) Multi-Root Input/Output Virtualization (IOV) Endpoint designs and particularly to a system and method for providing address decode and VF migration support in a PCIE Multi-Root IOV Environment.

BACKGROUND OF THE INVENTION

Currently existing single-root IOV endpoint designs allow for base address decoding. However, as the number of endpoint designs increase such designs may introduce new issues with regards to data management, or the like, which may not be adequately addressed. For example, multi-root IOV endpoint designs have recently been introduced and these multi-root IOV endpoint designs have introduced implementation issues in congestion management, virtual function migration and IOV reset mechanisms.

Therefore, it may be desirable to provide a solution which addresses the above-referenced problems associated with multi-root IOV endpoint designs.

SUMMARY OF THE INVENTION

Accordingly, an embodiment of the present invention is directed to a method for providing address decode and Virtual Function (VF) migration support in a Peripheral Component Interconnect Express (PCIE) multi-root Input/Output Virtualization (IOV) environment, including: receiving a Transaction Layer Packet (TLP) from the PCIE multi-root IOV environment; comparing a destination address of the TLP with a plurality of base address values stored in a Content Addressable Memory (CAM), each base address value being associated with a Virtual Function (VF), each VF being associated with a Physical Function (PF); when a base address value included in the plurality of base address values matches the destination address of the TLP, providing the matching base address value to the PCIE multi-root IOV environment by outputting from the CAM the matching base address value; and constructing a requestor ID for the VF associated with the matching base address value, the requestor ID being based upon the output matching base address value and a bus number for a PF which owns the CAM.

A further embodiment of the present invention is directed to a computer-readable medium having computer-executable instructions for performing a method for providing address decode and Virtual Function (VF) migration support in a Peripheral Component Interconnect Express (PCIE) multi-root Input/Output Virtualization (IOV) environment, said method including: receiving a Transaction Layer Packet (TLP) from the PCIE multi-root IOV environment; comparing a destination address of the TLP with a plurality of base address values stored in a Content Addressable Memory (CAM), each base address value being associated with a Virtual Function (VF), each VF being associated with a Physical Function (PF); when a base address value included in the plurality of base address values matches the destination address of the TLP, providing the matching base address value to the PCIE multi-root IOV environment by outputting from the CAM the matching base address value; and constructing a requestor ID for the VF associated with the matching base address value, the requestor ID being based upon the output matching base address value and a bus number for a PF which owns the CAM.

An additional embodiment of the present invention is directed to a system, including: a controller, the controller configured for being communicatively coupled with a Peripheral Component Interconnect Express (PCIE) multi-root Input/Output Virtualization (IOV) environment via an Advanced High Performance Bus (AHB) interface, the controller including a Content Addressable Memory (CAM) interface state machine, the CAM interface state machine being configured for controlling operations of a communicatively coupled Content Addressable Memory (CAM), wherein the controller is configured for managing VF migration requests, for providing base address decoding functionality, and for managing base address updating in the PCIE multi-root IOV environment.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

multi-root Input/Output Virtualization (IOV) environment in accordance with an exemplary embodiment of the present invention.

DETAILED DESCRIPTION OF THE INVENTION

Reference will now be made in detail to the presently preferred embodiments of the invention, examples of which are illustrated in the accompanying drawings.

Figure 1:
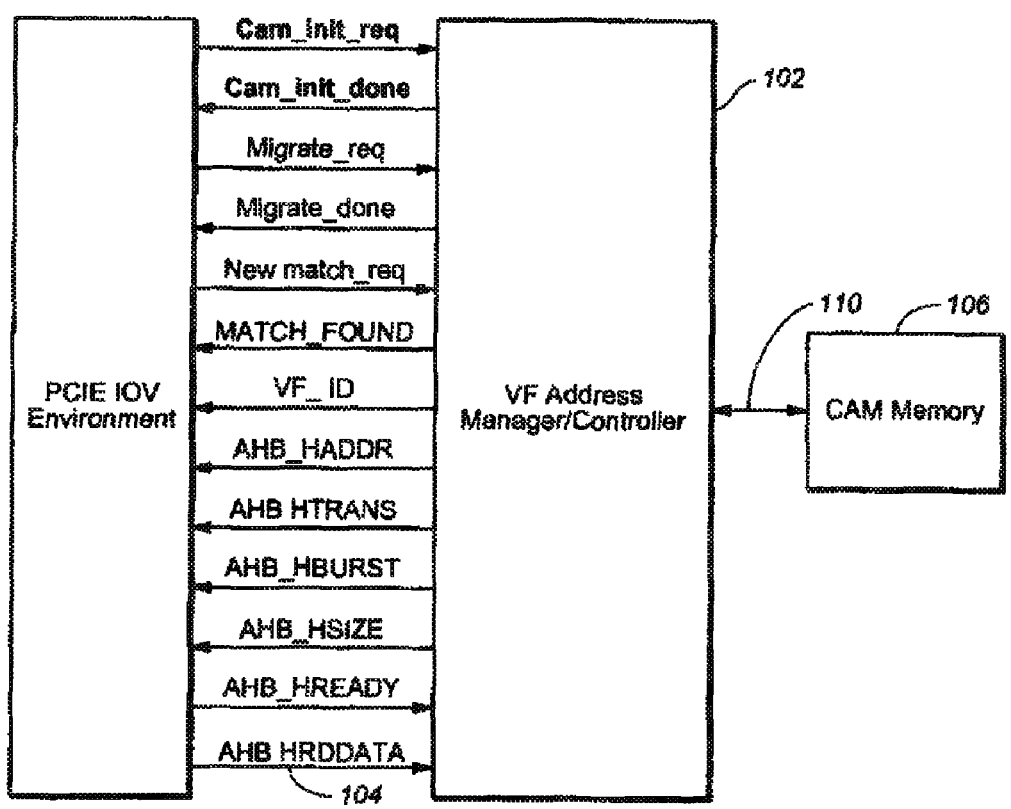
FIG. 1 is an illustration of a system for providing address decode and Virtual Function (VF) migration support in a Peripheral Component Interconnect Express (PCIE) multi-root Input/Output Virtualization (IOV) environment in accordance with an exemplary embodiment of the present invention.
Figure 2:
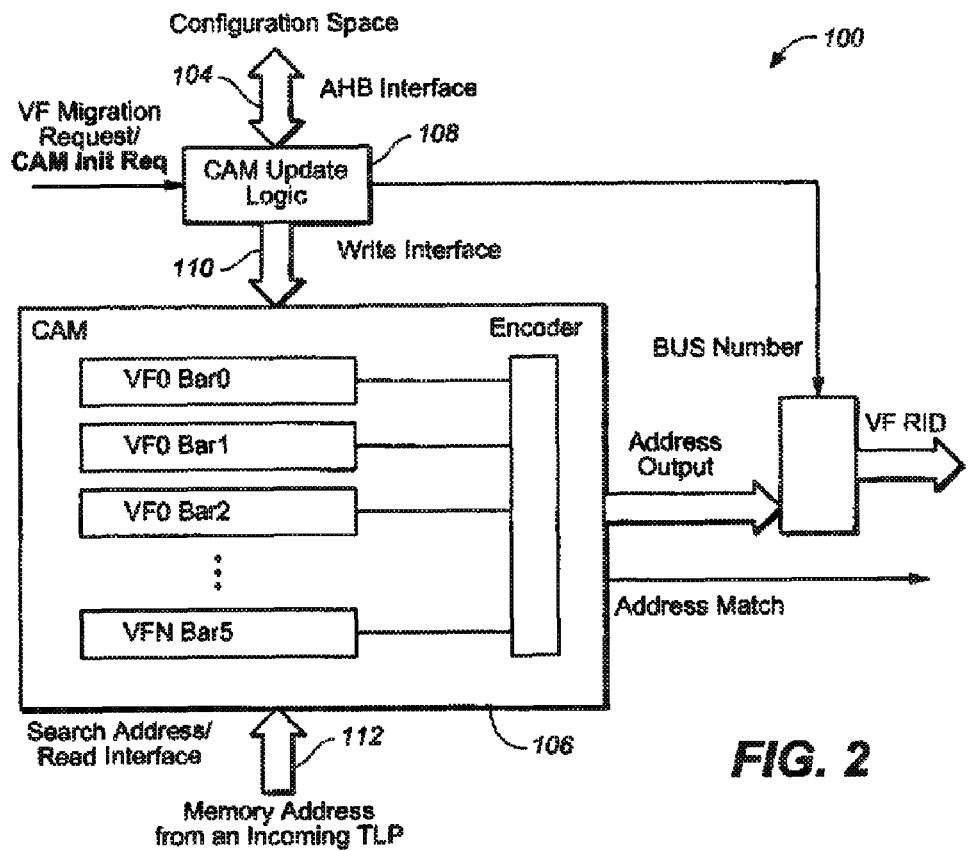
FIG. 2 is a block diagram illustrating the implementation of the controller of the system, such as shown in FIG. 1, in accordance with an exemplary embodiment of the present invention.

Referring generally to FIGS. 1 and 2, a system 100 for providing address decode and Virtual Function (VF) migration support in a Peripheral Component Interconnect Express (PCIE) multi-root Input/Output Virtualization (IOV) environment in accordance with an exemplary embodiment of the present invention is shown. The system 100 may include a controller 102. In a current embodiment of the present invention, the controller 102 may be a VF controller/PCIE multi-root IOV address decode controller. Further, the controller 102 may be configured for managing base address decoding functions and may be further configured for supporting VF migration from one Physical Function (PF) to another in a flexible manner within a multi-root IOV Endpoint Transaction Layer design implementation. Physical function may be defined as an IOV-capable function, such as described in "Single Root I/O Virtualization and Sharing Specification Revision 0.9" published by PCI-SIG, which is herein incorporated by reference, and will hereinafter be referred to as [2]. Further, in multi-root systems, a Physical Function may exist within a Virtual Hierarchy (VH). Virtual Hierarchy (VH) may be defined as a portion of a multi-root topology which is assigned to a single PCIE hierarchy, such as described in "Multi-Root I/O Virtualization and Sharing Revision 0.7" dated Jun. 8, 2007 and published by PCI-SIG, which is herein incorporated by reference, and will hereinafter be referred to as [1]. Transaction Layer may be defined as an Upper Layer that is above a Link Layer and a Physical Layer. Further, the system 100 of the present invention may be defined within the context of a PCIE multi-root IOV Transaction Layer, as specified by [1]. Still further, Virtual Function (VF) migration may be defined as the migration of a VF from a first VH to a second VH in a multi-root system(s).

In an exemplary embodiment, the controller 102 may be/may be configured for being communicatively coupled with a PCIE multi-root IOV environment. For example, the controller 102 may be a VF migration controller communicatively coupled with the PCIE multi-root IOV environment via an Advanced High Performance Bus (AHB) interface 104. For instance, the AHB interface 104 may be an AHB Master Interface as defined by AMBA AHB Specification 2.0 (AMBA being a Trademark of Advanced RISC Machines Limited/ARM Ltd. and AHB being a core bus used in most ARM processor systems for communicating with peripherals in systems). In the context of the present invention, the AHB interface/AHB bus master 104 may be used by the controller 102 for accessing/reading values of Base Address Registers (BARs) from a configuration space of a PCIE IOV Endpoint device. Base Address Registers (BARs) may be defined in a PCI/PCIE configuration space of a device and may be used to decode and claim an incoming PCI/PCIE transaction request based on a destination address available in the transaction request.

In further embodiments, the system 100 may further include a Content Addressable Memory (CAM) 106. The CAM 106 may be an associative type of memory which may be generally used to search a pattern among all locations in a single clock cycle time. In the present invention, the CAM 106 may be used to search for an address/base address/BAR value in the CAM 106 that matches a destination address of an incoming Transaction Layer Packet (TLP). When a matching address is found, the CAM 106 may return a Virtual Function ID of a function to which the destination address in the TLP belongs to. The controller 102 may be communicatively coupled with the CAM 106. Further, the controller 102 may include/contain/implement an internal state machine, such as a CAM interface state machine, for controlling operations of the communicatively coupled CAM 106/CAM memory.

In a current embodiment of the present invention, the controller 102 may be configured for being in various states, in which the controller 102 performs various operations. For example, the controller 102 may be configured for being in a CAM update state. In the CAM update state, the controller 102, which may be configured with CAM update logic, may write values of base addresses (ex. —BAR values) for each enabled Virtual Function of a PCIE multi-root IOV environment/device into the CAM 106 (ex. —CAM memory). Generally, the CAM update state is entered during a PCIE initialization phase using a CAM_INIT_REQ input signal when BARs/BAR values are updated in configuration space of a Physical Function. For example, the CAM_INIT_REQ may be an input signal (see FIGS. 1 and 2) from the PCIE IOV environment to the controller 102 which may be 1 bit wide and may signify the start of CAM memory initialization with values read from BAR(s)/configuration register(s) of an associated physical function via the AHB master interface 104. The AHB interface 104 may be used by the controller 102 to access the BARs during updating of the CAM 106 and to read values (ex. —updated values/base addresses/base address values) from the BARs in the configuration space into the CAM/CAM memory 106. Interface signals may be standard interface signals as defined in the AMBA AHB Specification 2.0. In additional embodiments, the controller 102 may be configured for minimizing updates to the CAM 106 by comparing a new/updated value obtained from the BAR(s) of the configuration space with an old value (ex. —a value/base address that is already present in the CAM). If the controller 102 determines that the new value (ex. —value/base address obtained from the BARs of the configuration space) is the same as an old value (ex. —a value/base address which is already present in the CAM), the controller 102 will not update the CAM 106 with the unnecessary update. Thus, the controller 102 may save in power dissipation of the system 100 as it may prevent unnecessary updates/writes. For example, the controller 102 may be able to prevent unnecessary updates/writes to approximately 1536 locations in the CAM 106. When initialization/reading of updates into the CAM 106 is complete, an output signal may be sent from the controller 102 to the PCIE IOV environment and/or to a logic block that requested initialization to indicate that initialization of the CAM 106 is complete. For instance, the output signal may be a 1 bit wide signal, such as a CAM_INIT_DONE signal (as shown in FIG. 1).

In further embodiments, the controller 102 may be configured for being in a CAM search state. When in the CAM search state, the controller 102 may be configured for issuing a read command to the CAM 106 to find a matching location in the CAM which includes a same base address value as an address in an incoming TLP packet.

In additional embodiments, the controller 102 may be configured for being in a CAM erase state. When in the CAM erase state, the controller 102 may be configured for erasing a value stored in a location of the CAM whenever a migrate-out request is received by controller 102, the value being associated with a Virtual Function which has undergone/is undergoing/will undergo a migrate out event.

In current embodiments of the present invention, the controller 102 may be configured for being in a CAM RDY state, which may be equivalent to an IDLE state. When in the CAM RDY state, the controller 102 may be configured for waiting for a next command.

Figure 3:
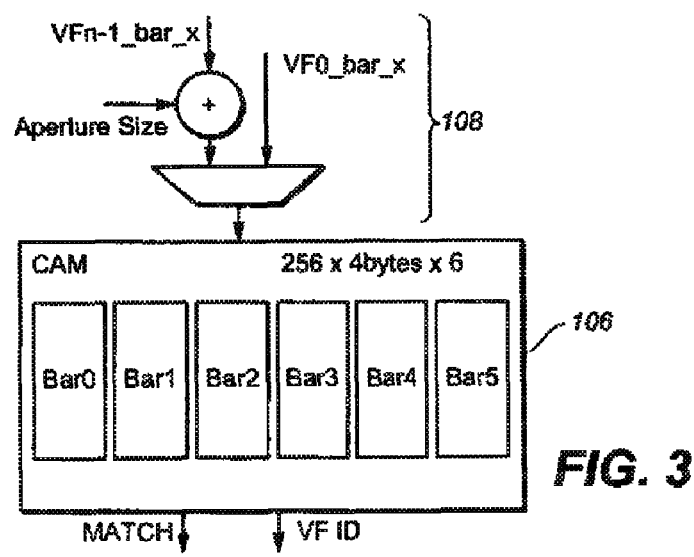
FIG. 3 is an illustration of the memory organization of a Content Addressable Memory (CAM) implemented with the controller in the system, such as shown in FIG. 1, in accordance with an exemplary embodiment of the present invention.

In multi-root environments/devices, VF migration may be an optional feature which, as discussed above, allows a VF to be migrated from one VH to another VH. For a multi-root device which supports a large number of VFs, a large number of comparisons may need to be made between an address (such as a destination address) of an incoming TLP and addresses associated with the supported VFs. Implementation of the CAM 106, as described above, allows the system 100 to handle a large number of comparisons which may need to be performed when an address of incoming TLP is compared to base addresses associated with all supported VFs for finding a matching address. In exemplary embodiments, a multi-root device may calculate base addresses (via BAR generator hardware) for any of its VFs via an equation, such as VFn_bar1 start address=VF1_bar1 start address+(n−1) VF1_bar1 aperture size. Memory aperture size supported by each BAR may be obtained as described in "PCIE Base Specification" published by PCI-SIG. In exemplary embodiments, the CAM 106 may be updated whenever BAR settings/values are modified in the configuration space (ex. —such as by firmware). FIG. 3 shows the organization of memory of the CAM 106 and of the CAM update logic 108 of the controller 102. The CAM update logic 108 may be configured to initialize the CAM with BAR addresses during PCIE initialization.

VF migration into a VH is possible when unmapped Logical Virtual Functions (LVFs) are available. In exemplary embodiments of the present invention, the system 100 may be configured for disabling base address decoding for unmapped LVFs, since there are no resources associated with the unmapped LVFs. During VF migration, the system 100 of the present invention is configured for mapping an unmapped LVF to a Mission Virtual Function (MVF). Once the unmapped LVF is mapped to the MVF, and VF migration is complete, the system 100 is further configured for enabling base address decoding for allowing access to supported resources.

In current embodiments of the present invention, an incoming TLP (see FIG. 2) may be routed by the system 100 to an appropriate function for handling completions based on a destination address specified in a header of the incoming TLP. In exemplary embodiments, the system 100 may compare the destination address of the TLP with all base addresses/BAR values in the CAM 106 which are associated with supported VFs, each of said supported VFs being associated with a Physical Function (PF). When a base address in the CAM 106 (as described above) matches the destination address of the TLP, the CAM 106 is configured for outputting the base address, the content of which matches the destination address. In exemplary embodiments, a VF corresponding to/associated with the matching base address/output base address is the transaction owner and may need to send a response (if required). In additional embodiments, the system 100 may be configured for constructing a requestor ID for the VF associated with the output base address. The requestor ID may be constructed based on or constructed from the output base address and a bus number value associated with a PF which owns the CAM 106. (See FIG. 2).

Each Physical Function (PF) in a Virtual Hierarchy (VH) may support a number of Logical Virtual Functions (LVFs) which may be mapped to Mission Virtual Functions (MVFs) by the system 100, such as via software. Unmapped LVFs may be present for supporting VF migration. In exemplary embodiments, the system 100 (ex. —the controller 102) may be configured for initializing contents of the CAM 106 so as to disable base address decoding for all VFs (ex. —LVFs) which are unmapped. (ex. —such as by initializing to 32'h0000_0000). In further embodiments, initially, the system 100 may initialize all locations in the CAM 106 such that base address decoding is disabled, and then, locations in the CAM may be selectively updated with BAR values by the CAM update logic 108 via the AHB interface 104 (for accessing configuration space) & a write interface 110 (said BAR values having been updated in corresponding BARs in configuration space). In further embodiments, the system 100 of the present invention is configured for asserting an interrupt when VF migration into a VH has been completed. Further, the system 100 may be configured for providing a bus output port signal (ex. —Migrate_done) to provide an indication that a VF migration request has been completed. For example, the bus output port signal may be ten bits wide. Further, a first bit of the bus output port signal may indicate that a migrate-in request has been completed for a specified VF, or alternatively, a second bit of the bus output port signal may indicate that a migrate-out request has been completed for the specified VF. The remaining eight bits may specify the VF ID for the VF which has had the migrate-in or migrate-out event. Still further, the system 100 is configured for enabling base address decoding for a VF which has a migrate-in event. For instance, the CAM 106 may be updated/programmed with VF BAR values/base addresses from BARs of a corresponding VF in the configuration space. Once the CAM is updated with the VF BAR values, the VF associated with the VF BAR values is ready to accept TLPs. In still further embodiments, the system 100 may be configured for disabling base address decoding for a VF which has a migrate-out event.

In exemplary embodiments, such as shown in FIGS. 1-3, the system 100/controller architecture of the present invention may take approximately 512 (256*2) cycles/clock cycles to initialize each bank of the CAM 106. For the system 100 of the present invention, a write operation to the CAM 106 may include an erase operation stage and a CAM/memory update operation stage. Further, a search operation, such as via the Search Address/Read Interface 112 may be initiated by a normal read operation to the CAM 106 with a search pattern being applied on address pins of the CAM 106. In current embodiments of the present invention, the search operation may take the system 100/controller architecture a single clock cycle to determine the match condition (ex. —whether a VF base address in the CAM matches a destination address of an incoming TLP). In further embodiments, such as shown in FIGS. 1-3, the CAM/memory update operation stage may take the system 100 approximately 512 cycles/clock cycles to complete when BAR generator hardware is utilized for generating a base address of an nth VF (using the above-described equation). Alternatively, the system 100 may cause BAR values to be read from configuration space and then updated into the CAM 106, which may take extra clock cycle delays incurred by the AHB read transaction to the PCIE configuration space.

Figure 4:
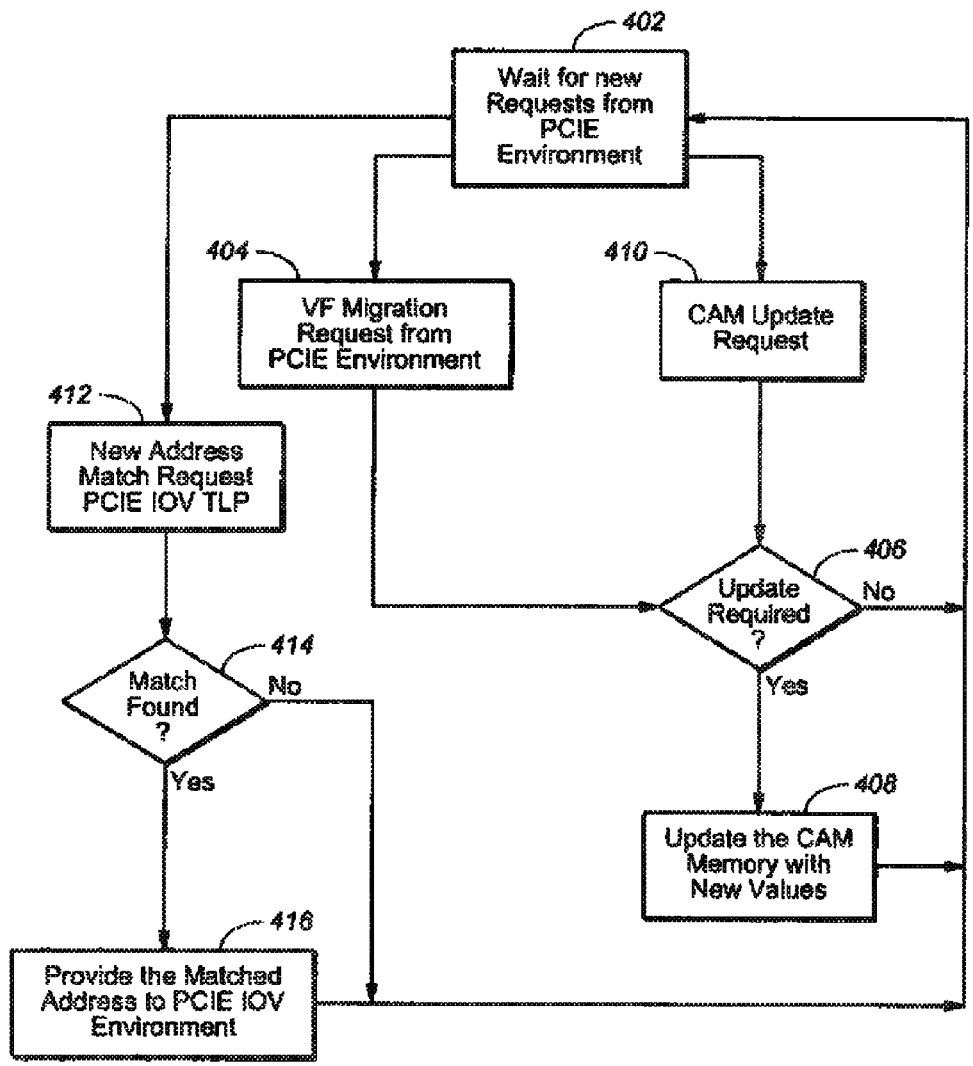
FIG. 4 is a flow diagram illustrating operation of a system, such as shown in FIG. 1, in accordance with an exemplary embodiment of the present invention.

FIG. 4 illustrates a flow diagram for the system 100 in accordance with an exemplary embodiment of the present invention. In exemplary embodiments, the system 100 may be configured for waiting for new requests from a PCIE environment 402. Further, the system 100 may further be configured for receiving a VF migration request from the PCIE environment 404. For example, the VF migration request (ex. —Migrate_req) may be a bus input port request/signal having a width of 10 bits specifying the request type (whether the request is for migration into the system 100 or migration out of the system 100). This input signal may also specify an identification number of the VF which is involved in the migration operation. A first bit of the Migrate_req may, on an event of that bit, have a value of "1", thereby signifying that there is a request from an outside entity to migrate the VF into the PF. A second bit of the Migrate_req may, on an event of that bit, have a value of "1", thereby signifying that there is a request from an outside entity to migrate the VF out of the PF. The first bit and the second bit of the Migrate_req may thus be mutually exclusive of one another. Further, the remaining bits of the Migrate_req may specify the identification of the VF which is the subject of the migration request. When the VF migration request is received, the system 100 may further be configured for determining whether the CAM needs updating 406. When the system 100 determines that the CAM needs updating, the CAM is updated with new base address values 408.

In further embodiments, the system 100 is configured for receiving a CAM update request 408 from the PCIE environment. When the CAM update request is received, the system 100 is further configured for determining if an update to the CAM is required 410, and, when the system 100 determines that the CAM needs updating, the CAM is updated with new base address values 408. For instance, the system 100 may be configured for comparing a new/updated base address value from BARs of the configuration space to an old base address value (base address value currently stored in the CAM). If the values differ, the system 100 may update the CAM with the new values, if the values are the same, the system 100 may not update the CAM, thereby promoting efficiency of the system 100.

In additional embodiments, the system 100 is configured for receiving an incoming TLP from the PCIE IOV environment 412. The system 100 is further configured for comparing a destination address of the TLP to base addresses in the CAM to determine if there is an address match, each base address being associated with a VF, each VF being associated with a PF 414. When the system 100 determines that a base address in the CAM matches the destination address, the system 100 is configured for outputting the matching base address to the PCIE IOV environment 416.

Figure 5:
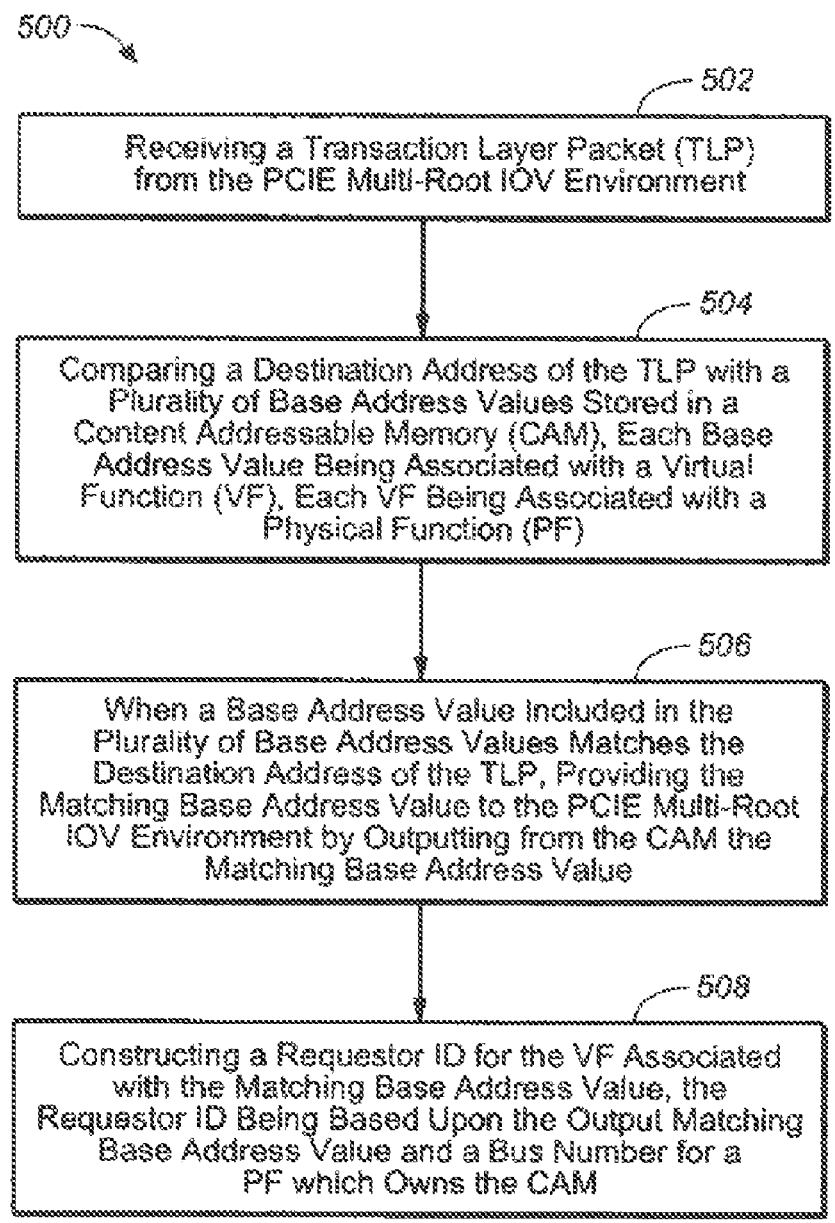
FIG. 5 is a flow chart illustrating a method for providing address decode and Virtual Function (VF) migration support in a Peripheral Component Interconnect Express (PCIE)

FIG. 5 is a flowchart illustrating a method for providing address decode and Virtual Function (VF) migration support in a Peripheral Component Interconnect Express (PCIE) multi-root Input/Output Virtualization (IOV) environment. The method 500 may include receiving a Transaction Layer Packet (TLP) from the PCIE multi-root IOV environment 502. The method 500 may further include comparing a destination address of the TLP with a plurality of base address values stored in a Content Addressable Memory (CAM), each base address value being associated with a Virtual Function (VF), each VF being associated with a Physical Function (PF) 504. The method 500 may further include, when a base address value included in the plurality of base address values matches the destination address of the TLP, providing the matching base address value to the PCIE multi-root IOV environment by outputting from the CAM the matching base address value 506. The method 500 may further include constructing a requestor ID for the VF associated with the matching base address value, the requestor ID being based upon the output matching base address value and a bus number for a PF which owns the CAM 508.

In further embodiments, the method 500 may include providing the requestor ID to the PCIE multi-root IOV environment via a completion packet 510. The method 500 may further include receiving a CAM update request from the PCIE multi-root IOV environment 512. The method 500 may further include determining if an update of the CAM is required 514. The method 500 may further include, when it is determined that an update of the CAM is required, writing new base address values to the CAM 516. The method 500 may further include receiving a VF migration request from the PCIE IOV environment 518. The method 500 may further include mapping an unmapped Logical Virtual Function (LVF) to a Mission Virtual Function (MVF) 520. The method 500 may further include enabling base address decoding for a VF which has undergone a migrate-in event 522. The method 500 may further include accessing base address values for the VF which has undergone the migrate-in event from a configuration space of the PCIE multi-root IOV environment 524. The method 500 may further include updating the CAM by writing the base address values to the CAM for the VF which has undergone the migrate-in event 526.

In exemplary embodiments, the system 100/controller architecture of the present invention is configured for managing VF migration requests, for providing base address decoding functionality, and for managing base address updating in the PCIE multi-root IOV environment. Further, the system 100 is configured for selectively enabling/disabling base address decoding during/to facilitate VF migration. Still further, CAM update logic of the system 100 may be configured for providing a flexible interface for updating contents of the CAM 106 with respect to updates in configuration space of the virtual function. Additionally, the system 100 of the present invention may be configured for promoting efficient handling of VF migration, for promoting minimum latency during VF migration, and for promoting efficient management of base address updating.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system, comprising:
a controller, the controller configured for being communicatively coupled with a Peripheral Component Interconnect Express (PCIE) multi-root Input/Output Virtualization (IOV) environment via an Advanced High Performance Bus (AHB) interface, the controller including a Content Addressable Memory (CAM) interface state machine, the CAM interface state machine being configured for controlling operations of a communicatively coupled Content Addressable Memory (CAM),
wherein the controller is configured for managing VF migration requests, for providing base address decoding functionality, and for managing base address updating in the PCIE multi-root IOV environment.

2. A system as claimed in claim 1, wherein the system receives a Transaction Layer Packet (TLP) from the PCIE multi-root IOV environment.

3. A system as claimed in claim 2, wherein the controller compares a destination address of the TLP with a plurality of base address values stored in a Content Addressable Memory (CAM), each base address value being associated with a Virtual Function (VF), each VF being associated with a Physical Function (PF).

4. A system as claimed in claim 3, wherein when a base address value included in the plurality of base address values matches the destination address of the TLP, the system provides the matching base address value to the PCIE multi-root IOV environment by outputting from the CAM the matching base address value.

5. A system as claimed in claim 4, wherein the system is configured for constructing a requestor ID for the VF associated with the matching base address value, the requestor ID being based upon the output matching base address value and a bus number for a PF which owns the CAM.

6. A system as claimed in claim 5, wherein the system is configured for providing the requestor ID to the PCIE multi-root IOV environment via a completion packet.

7. A system as claimed in claim 6, wherein the system receives a CAM update request from the PCIE multi-root IOV environment.

8. A system as claimed in claim 7, wherein the system determines if an update of the CAM is required.

9. A system as claimed in claim 8, wherein when it is determined that an update of the CAM is required, the system writes new base address values to the CAM.

10. A system as claimed in claim 9, wherein the system receives a VF migration request from the PCIE IOV environment.

11. A system as claimed in claim 10, wherein the system maps an unmapped Logical Virtual Function (LVF) to a Mission Virtual Function (MVF).

12. A system as claimed in claim 11, wherein the system enables base address decoding for a VF which has undergone a migrate-in event.

13. A system as claimed in claim 12, wherein the system accesses base address values for the VF which has undergone the migrate-in event from a configuration space of the PCIE multi-root IOV environment.

14. A system as claimed in claim 13, wherein the system updates the CAM by writing the base address values to the CAM for the VF which has undergone the migrate-in event.

15. A system, comprising:
a Content Addressable Memory (CAM);
a controller, the controller configured for being communicatively coupled with the CAM, the controller further configured for being communicatively coupled with a Peripheral Component Interconnect Express (PCIE) multi-root Input/Output Virtualization (IOV) environment via an Advanced High Performance Bus (AHB) interface, the controller including a CAM interface state machine, the CAM interface state machine being configured for controlling operations of the communicatively coupled CAM,
wherein the controller manages VF migration requests, provides base address decoding functionality, and manages base address updating in the PCIE multi-root IOV environment.

* * * * *